Dec. 26, 1961  J. E. WOLBER  3,014,789
CORROSION TEST PROBE
Filed Nov. 27, 1959

INVENTOR.
JAMES E. WOLBER
BY
Edward H Lang
ATTORNEY

United States Patent Office 3,014,789
Patented Dec. 26, 1961

3,014,789
CORROSION TEST PROBE
James E. Wolber, Roselle, Ill., assignor to The Pure Oil Company, Chicago, Ill., a corporation of Ohio
Filed Nov. 27, 1959, Ser. No. 855,660
8 Claims. (Cl. 23—253)

This invention is directed to a test probe for use in measuring the rate of corrosion of a metal test element. More specifically, the invention is directed to a test probe employing a torsionally stressed, tubular test element which is exposed to a corrosive environment.

The prior art teaches the use of various devices for measuring the corrosivity of an environment by exposing a corrodible test element and then determining the extent or rate of corrosion of the test element. Some such devices require removal of the test element from the corrosive environment for weighing or other measurement. Other devices do not require removal of the test element, but have the disadvantage of giving only a non-quantitative corrosion-rate determination, that is, the device only indicates whether the test element has failed due to corrosion. Other devices measure and indicate the corrosion rate quantitatively, but have the disadvantage of requiring the use of electronic metering circuits in cooperation with the test probe.

It is an object of this invention to provide a simple test probe which will measure the rate of corrosion of a test element and indicate quantitatively the extent to which the corrosion has progressed. It is a further object of this invention to provide a corrosion test probe which does not require the use of auxiliary electronic circuits and equipment.

Briefly, this invention is directed to a corrosion-sensing probe comprising a single tubular metallic test element which is supported by and projects from a threaded plug-type base. A spring mechanism cooperates with a rod mounted concentrically within the tubular test element to apply a torsional stress to the test element. As the test element corrodes, metal is removed from the outside of the tubular surface, and the unit stress in the metal is thereby increased. This increased stress results in a greater angular deformation of the test element. The angle through which the test element twists is indicated by a pointer attached to the rod which extends concentrically through the test element.

The apparatus of this invention is best described with reference to drawings, of which:

Figure 1:
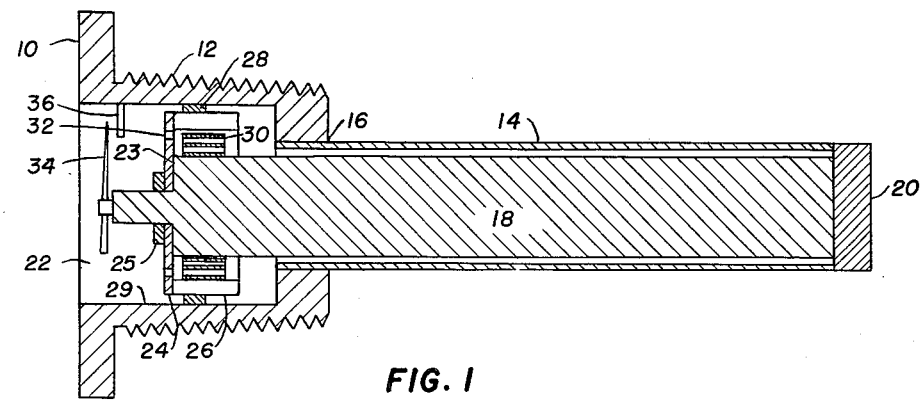
FIGURE 1 is a sectional view of the corrosion test probe of this invention.

Referring to FIGURE 1, base 10 is threaded at 12 for insertion in a standard pipe or pressure-vessel fitting. Thin-wall test element 14 is supported by base 10 at point 16, and is preferably silver-soldered thereto. Various means may be employed to secure tubular test element 14 to the base, provided a strong, fluid-tight, seal is obtained between the base and test element. Test element 14 is a small-diameter, seamless tube, fabricated from any corrodible metal selected. Generally, the test element should be fabricated from the same metal as that of the structure which the corrosive environment under study contacts and corrodes. The dimensions of the test element are not critical, but a diameter of about 0.25 inch, a wall thickness of about 0.01 inch, and a length of about 5 inches are satisfactory. Rod 18, which is slightly smaller in diameter than the interior of the test element, extends concentrically through test element 14. Disc 20 is secured to the projecting ends of rod 18 and test element 14 and provides a closure therefor. Alternatively, the test element may be fabricated with one projecting closed end and rod 18 may be internally secured to this closed end, as by silver-soldering. In any event, the rod and test element must be securely joined adjacent to the closed, unsupported end of the test element.

Figure 2:
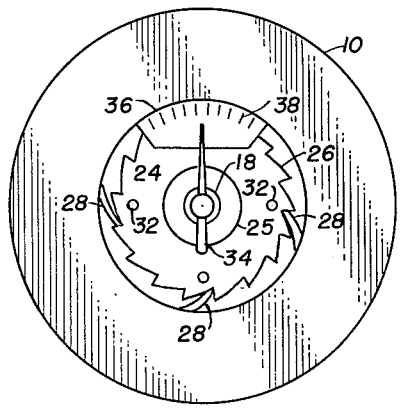
FIGURE 2 is an end view of the test probe depicted in FIGURE 1.

Rod 18 extends beyond the supported terminal end of test element 14 and into the hollow portion 22 of base 10. A cup-shaped spring housing 24 is mounted concentrically on rod 18 and is supported thereby in rotatable relation therewith. Housing 24 abuts against shoulder 23 of rod 18, and is secured in place by snap-ring 25. The exterior periphery of spring housing 24 comprises a plurality of teeth 26, which form a ratchet wheel. These teeth are adapted to be engaged by four ratchet pawls 28, which are secured to the interior cylindrical surface 29 of the hollow portion of base 10. Pawls 28 serve to permit rotation of the spring housing in a counterclockwise direction only. A spiral spring 30 is disposed within the spring housing. One end of spiral spring 30 is secured to the spring housing and the other end is secured to rod 18. Spring housing 24 is equipped with two holes 32 adapted to accommodate a spanner wrench which may be used to rotate the spring housing and wind spring 30. An indicator needle 34 is attached to the end of rod 18. Referring to FIGURE 2, it can be seen that needle 34 cooperates with arcuate register 36 which is supported by base 10 adjacent to the end of needle 34. This register has scribed on its face a plurality of radial indicating lines 38, which may conveniently read in fractions of a degree.

Figure 3:
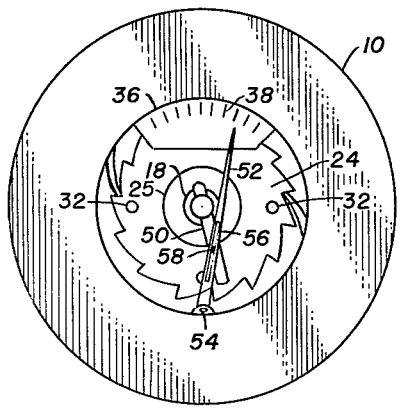
FIGURE 3 is an end view of a test probe including means for magnifying the deflection of the indicating needle.

FIGURE 3 shows a motion-magnifying means which may be used to increase the sensitivity of the corrosion test probe of this invention. Arm 50 is secured to rod 18, as was needle 34 of FIGURE 2. Needle 52 is pivotably secured to base 10 by pin 54 which passes through the lower end of needle 52. An elongated slot, 56, passes through needle 52 and extends parallel to the axis of the needle. This elongated slot is preferably located adjacent to the point about which needle 52 rotates, i.e., pin 54. A second pin, 58, extends through elongated slot 56 and is securely fastened to arm 50 adjacent the unsupported end thereof. Thus, it can be seen that a relatively small deflection of arm 50 will result in a much greater angular deflection of needle 52. The multiplication factor may be varied by locating pin 58 and elongated slot 56 nearer to or farther from the point about which needle 52 pivots.

Figure 4:
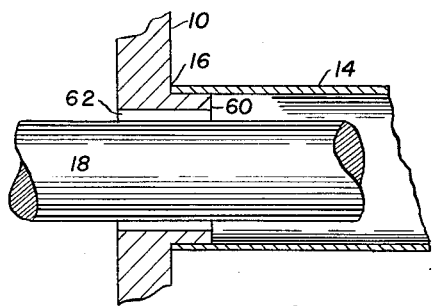
FIGURE 4 is a fragmental view of a portion of the probe depicted in FIGURE 1, showing an alternate test probe structure.

A modified base structure adapted to provide support for the unsecured end of rod 18 is shown in FIGURE 4. Base 10 extends outwardly at 60 to provide a diameter upon which test element 14 is secured. Opening 62 in the base is made an appropriate size to provide a slide fit for rod 18. This feature affords additional rigidity and provides support for the otherwise cantilever end of rod 18.

In operation, base 10 is secured in a suitable threaded opening in a pipe or pressure vessel, so that test element 14 extends within the vessel and into contact with the corrosive environment under study. The position of needle 34 is then noted. Spring housing 24 is rotated in a counterclockwise direction to wind spring 30. Clockwise rotation of the spring housing, which would permit unwinding of the spring, is prevented by ratchet teeth 26 and pawls 28. The spring, when wound, applies a torsional force to rod 18, and this force is communicated to the projecting end of test element 14, to which rod 18 is connected. Thus, when the spring is wound, a torsional stress is applied to the test element, and this stress produces an angular deformation, or twisting of the test element, which twisting is proportional to the applied stress. Since the supported end of the test element is secured firmly to base 10, the angle of twist, through which the unsupported end of the test element rotates under the applied torque is in accordance with Hooke's law. Rod 18 is solid as compared to the hollow, thin-wall test element. Rod 18 preferably has an outside diameter which is nearly as great as the inside diameter of the test element. Therefore, the angular deformation of rod 18 is small in comparison with the angular deformation of test element 14 for any given unit torque applied by spring 30. The deflection of needle 34 when the spring is wound will equal the sum of the deformations of the test elements and of the rod. Since the dimensions of the test element and rod are known, the magnitude of the stress applied to the test element can be readily determined through conventional engineering calculations. Tedious calculations can, however, be avoided by calibrating scale 38 in graduations which represent unit stress as applied to a standard test element.

Scale 38 may also be calibrated to read directly in terms of corrosion. As the test element corrodes, metal is removed from the outside surface thereof. The removal of metal results in a decrease in cross-sectional area of the tubular test element. Since the torque applied by spring 30 is constant, the unit stress applied to the test element increases as metal is removed by the corrosion process. Therefore, as corrosion proceeds, the magnitude of the angular deformation of the test element increases in proportion to the unit stress. This increase in deformation is indicated by needle 34. The movement of needle 34 during the winding of the spring serves to measure a magnitude of the stress applied to the test element. The movement of needle 34 during the period when the test element corrodes is a measure of the extent of corrosion of the test element during this period.

As a specific example of the operation of the probe, if the initial unsupported length of the test element is 5 inches, the diameter is 0.25 inch, and the unit stress applied by winding the spring is 22,000 p.s.i., the deformation of the test element (steel) will be about 5°. The deflection of needle 34 will be 5° plus the deformation of rod 18. If the corrosion process removes an amount of metal equivalent to 20% of the wall thickness of test element 14, needle 34 will move through one additional degree.

It is obviously desirable to utilize a needle having a radius of several inches to provide reasonable sensitivity in corrosion measurements. Alternatively, the motion multiplication device set out in FIGURE 3 may be used to provide more accurate measurements. Other motion multiplication devices known to the art may of course be used.

The initial applied stress may be of any desired magnitude. It is preferred to apply an initial stress not greater than about 80% of the yield stress of a test element. This is because the deformation of a test element is proportional to the amount of metal removed only so long as the yield stress of a test element is not exceeded. Since allowance must be made for the increase in unit stress in a test element produced by the corrosion process, it is preferred that the initial stress not exceed about 80% of the yield stress. Generally speaking, the higher the initial applied stress, the greater will be the deflection of needle 34 for any given reduction in area of the test element cross-section produced by the corrosion process. Hence, increased sensitivity of the instrument can be provided by using high initial stresses. An initial stress of about 80% of the yield stress of the test element is a good working compromise.

Formulas for the calculation of unit stresses and the corresponding angular deformations of rods and hollow tubes are set out in engineering handbooks and text books. To avoid the necessity of repeating tedious calculations it has been found most desirable to secure either needle 34 or register 38 in slidable, friction-tight relationship to the supporting rod or base. Two graduations are placed on scale 38, separated by an angular distance which corresponds to the distance through which rod 18 must be rotated to apply a suitable unit stress to test element 14. Before spring 30 is wound, the needle will be made to correspond with the first of these two graduation lines, by either rotating the needle or sliding the register. Spring 30 is then wound until the needle has moved and takes position opposite the second line, at which time it is known that the desired stress has been applied to the test element. If this stress is 22,000 p.s.i., it is known that a steel test element fabricated as before described will then deflect 1° if an amount of metal equivalent to 20% of the wall thickness of the test element is removed by corrosion. Other lines, corresponding to fractions of degrees, and therefore also corresponding to other percentages of wall-thickness loss, may be placed adjacent to the second graduation line. Thus, all that is necessary is to wind spring 30 to apply a torque sufficient to rotate needle 34 from the first graduation line to a second graduation line and then note the further movement of needle 34 during the corrosion process, and read directly the amount of metal removed from the test element.

The cross-section of the tubular test element need not be circular, but the use of circular test elements simplifies stress and deformation calculations. The use of square or hexagonal tubular elements will result in non-uniform stress distributions in these test elements, and such stress distributions may influence the corrosion of the test element. Where the system under study is itself subject to non-uniform stress distributions, the use of non-circular test elements may give results which correlate excellently with actual corrosion rates.

The embodiments of the invention in which an exclusive property or privilege is claimed are defined as follows:

1. A corrosion test probe comprising a supporting base having an opening therein, a thin-wall tubular test element, said test element being fabricated from a corrodible metal and supported at one end by said base for projection into a corrosive environment, said test element being secured to said base to provide a passageway from said base through said opening into said test element, and co-operating with said base to form a fluid-tight seal there-between, a rod disposed within said test element, one end of said rod being secured to the other end of said test element in fluid-tight relationship, means for applying torque to the other end of said rod, and indicating means to measure the angular rotation thereof.

2. An apparatus according to claim 1 in which said indicating means comprises a needle secured to said rod for rotation therewith, and an arcuate scale secured to said base.

3. An apparatus according to claim 1 in which said indicating means comprises means for multiplying the angular rotation of said rod.

4. An apparatus according to claim 3 in which said means for multiplying angular rotation comprises an arm secured perpendicularly to said rod, a needle pivotably secured at one end to said base, and having an elongated slot parallel to the axis of and passing through said needle near the pivotably secured end thereof, and a pin passing perpendicularly through said slot and secured to said arm near the free end thereof, whereby the rotative movement of said rod and arm is magnified.

5. An apparatus according to claim 1 in which said means for applying rotative torque to said rod comprises a cup-shaped spring housing rotatively, coaxially, supported by said rod, the peripheral surface of said housing having formed therein a plurality of teeth to make a ratchet wheel, a plurality of ratchet pawls secured to said base and engaging said teeth to permit rotation of said spring housing in one direction only, and a spiral coil spring within said housing, one end of said spring being secured to said spring housing and the other end being secured to said rod.

6. An apparatus according to claim 5 in which said base included an enlarged, cylindrical, hollow portion and said spring housing, spring, and pawls are disposed therein, said pawls projecting radially inward from the cylindrical wall of said hollow portion to engage the teeth on the periphery of said spring housing.

7. An apparatus according to claim 6 in which said rod is rotatively supported by said base at the point where said rod extends through said opening in said base.

8. A corrosion test probe comprising a supporting element with a passageway therethrough, a thin walled tubular test element fabricated of corrodible metal, one end of which is supported by said supporting element and fastened thereto in fluid-tight relationship, a rod element extending through said test element into said supporting element, said rod element being fastened to the other end of said test element in fluid-tight relationship, means for applying and maintaining torque to the end of said rod element extending into said supporting element, and means for indicating the rotational movement of the end of said rod element extending into said supporting element.

References Cited in the file of this patent

UNITED STATES PATENTS

| | | |
|---|---|---|
| 2,763,534 | Campbell | Sept. 18, 1956 |
| 2,827,724 | Edds | Mar. 25, 1958 |

OTHER REFERENCES

Uhlig, "Corrosion Handbook" (1948), page 1010.